United States Patent

[11] 3,583,505

| [72] | Inventors | Robert H. Van Valkinburgh<br>Pittsford;<br>Robert E. Kalvitis, Fairport, both of, N.Y. |
|---|---|---|
| [21] | Appl. No. | 789,113 |
| [22] | Filed | Jan. 2, 1969 |
| [45] | Patented | June 8, 1971 |
| [73] | Assignee | Xerox Corporation<br>Rochester, N.Y. |

[54] SPRING SCALE
12 Claims, 3 Drawing Figs.

[52] U.S. Cl. ...................................................... 177/232
[51] Int. Cl. ................................................... G01g 21/28
[50] Field of Search ......................................... 177/126,
225, 232, 233, 263

[56] References Cited
UNITED STATES PATENTS

| 2,458,669 | 1/1949 | Yeamans ..................... | 177/225 |
| 2,593,060 | 4/1952 | Schrader ..................... | 177/233X |
| 571,157 | 11/1896 | Forschner ..................... | 177/263 |
| 661,158 | 11/1900 | Stoelting et al. .............. | 177/225 |
| 797,091 | 8/1905 | Wilson ......................... | 177/232 |
| 1,255,269 | 2/1918 | Zinkiewicz ................... | 177/232 |
| 2,655,367 | 10/1953 | Andersen ..................... | 177/232X |
| 2,750,184 | 6/1956 | Warndahl...................... | 177/232X |

Primary Examiner—Stephen J. Tomsky
Assistant Examiner—George H. Miller, Jr.
Attorneys—Paul M. Enlow, James J. Ralabate, Norman E. Schrader, Ronald Zibelli and David C. Petre

ABSTRACT: A spring scale comprising, in a preferred embodiment, an upright tripod stand terminating at the upper portion thereof in a tripod head, an open sleeve in said head, a transparent graduated tube inserted therein with a spring in said tube connected at its lower end to a weighing pan.

PATENTED JUN 8 1971

INVENTORS
ROBERT H. VAN VALKINBURGH
ROBERT E. KALVITIS
BY
David C. Petrie
ATTORNEY

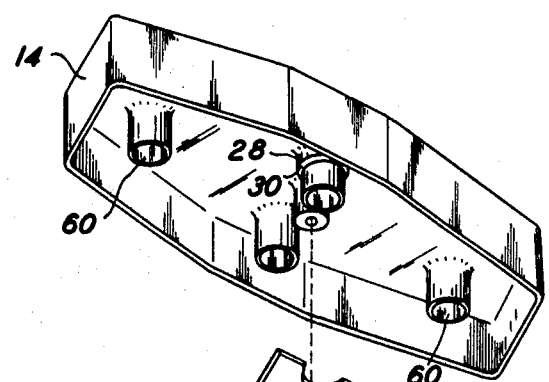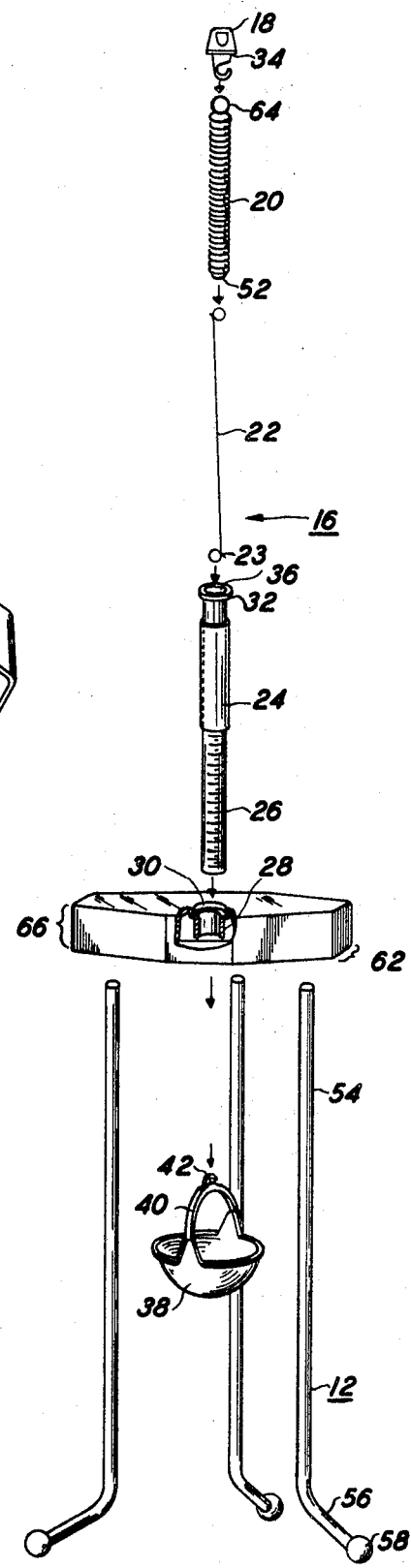

3,583,505

SPRING SCALE

BACKGROUND OF THE INVENTION

This invention relates to scales and more specifically to a spring scale.

A spring scale is a fundamental tool for the teaching of many principles in learning institutions below the college level. Efforts have been made to construct simple and inexpensive spring scales in order to provide as many scales per class as possible. However, the prior art efforts in this regard are relatively expensive, complicated and unsightly when compared to the novel and advantageous scale of this invention.

SUMMARY OF THE INVENTION

It is, therefore, an object of this invention to provide a spring scale which is simpler, more durable, less expensive and still more pleasing from a design viewpoint than any prior art spring scale, and otherwise more suitable for use in learning institutions below the college level.

It is a further object of this invention to provide a spring scale support which provides ready access to the scale weighing pan.

It is a further object of this invention to provide a spring scale which is quickly disassembled for easy storage in a very small space.

It is a further object of this invention to provide a spring scale which in addition to its many mechanical advantages possess a pleasing design.

It is a still further object of this invention to provide a color scale strip weight indicator.

The foregoing objects and others are accomplished in accordance with this invention by providing a spring scale comprising, in a preferred embodiment, an upright tripod stand terminating at the upper portion thereof in a tripod head, an open sleeve in said head, a transparent graduated tube inserted therein with a spring in said tube connected at its lower end to a weighing pan.

BRIEF DESCRIPTION OF THE DRAWINGS

For a better understanding of the invention as well as other objects and further features thereof, reference is made to the following detailed disclosure of this invention taken in conjunction with the accompanying drawings wherein:

FIG. 2 is a front-right side perspective view of the embodiment of FIG. 1 shown in disassembly with the component parts shown in relative position, for ease of understanding; and FIG. 3 is a front-left side perspective view of the underside of the tripod head.

DESCRIPTION OF THE PREFERRED EMBODIMENTS

Figure 1:
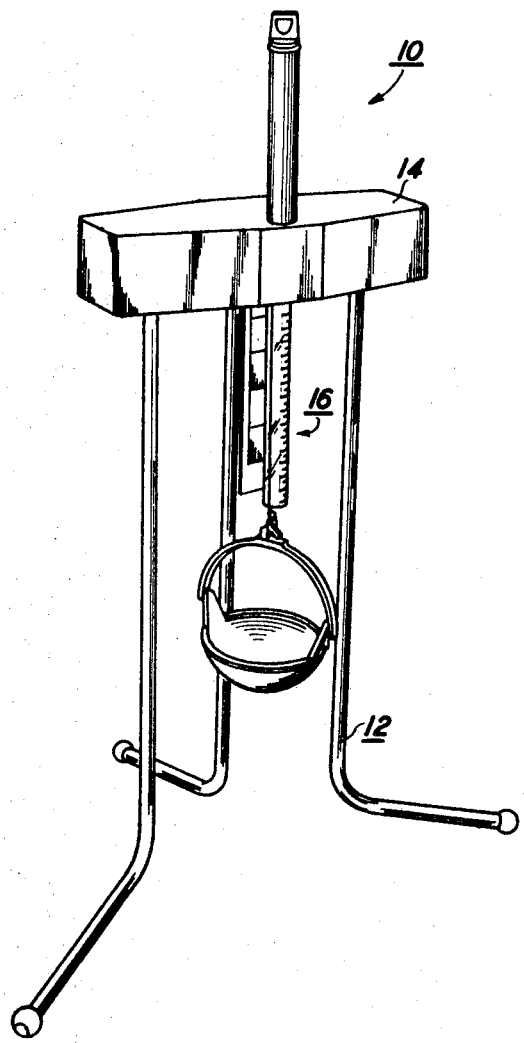
FIG. 1 is a front-left side perspective view of a preferred embodiment of the spring scale of this invention.

Referring now to the Figures, there is shown spring scale 10 made up of tripod legs 12, tripod head 14 and spring assembly 16 shown in disassembly in FIG. 2 for ease of understanding.

The spring assembly 16 comprises spring retainer 18, spring 20, spring extension 22, spacer sleeve 24, and graduated tube 26. It is seen that tube 26 is inserted in open cylindrical sleeve 28 in the top surface of the tripod head and also in spacer sleeve 24. Spacer sleeve 24 has an outside diameter less than the initial inside diameter of sleeve 28 when entered from the top and greater than the smaller diameter of sleeve 28 encountered within the sleeve 28. The bottom portion of spacer sleeve 24 rests in the recessed seat 30 in sleeve 28, the seat formed where the inside diameter of sleeve 28 decreases. The upper most portion of tube 26 terminates in a flange 32, which exceeds at least the inside diameter of spacer sleeve 24 which thereby supports tube 26 in sleeve 28. The spring extension 22 and spring 20 are then lowered through tube 26, flange 34 on the spring retainer butting against the top 36 of flange 32 of tube 26. It is seen that spacer sleeve 24 regulates how far tube 26 extends above and below the tripod head and in some embodiments hereof could be eliminated entirely with the flange 32 of tube 26 seated in sleeve 28 in the tripod head.

The weighing pan 38 with halter 40 may then be secured to the bottom most portion 23 of the spring extension 22 by means of hook 42. The top loop of the spring extension 22 may be secured to the bottom of coil spring 20 by insertion of the loop within the sleeve formed by the coils of the spring.

Optionally, a color strip 44 of varying colors 46—50 may be secured for example by screw 11 to the inside of the top portion of the tripod head 14 to present a color scale for indicating weight for example for kindergarten age children.

The bottom most portion 52 of spring 20 may serve as the scale indicator with this indicator registering on the zero portion of the scale on tube 26 when the scale is completely set up and ready for operation.

Referring more particularly to the tripod leg arrangement it is seen that each leg 12 is composed of a substantially straight, elongate vertical section 54 terminating near the lowermost extremity in an outwardly extending portion 56, the end of each leg terminating preferably in a nonscuff foot 58, for example comprising a plastic knob with a lug for insertion in a friction fit over the end of extended leg portion 56. The upper elongate portion 54 of each leg is friction fit snuggly into blind sleeve 60 provided in the underside of the tripod head 14. While legs 12 may be readily changed to an infinite number of positions by merely rotating leg sections 54 in sleeves 60, a leg arrangement approximately as shown provides for close to maximum scale stability.

A spring scale made for commercial introduction and made in accordance with the invention has the following makeup (measurements are in inches throughout): tripod head 14 of white molded high impact polystyrene is about a⅝ long, about 3¾ wide at the widest portion, narrowing to about 2½ at end portions 62 with a dimension 66 of about 2. Spring retainer 18, feet 58, halter 40 and pan 38 which has a diameter measured to the outer rim of about 3¾ with a depth of about 1½ are also made of white molded high impact polystyrene. Each leg is shaped tubular aluminum with an outside diameter of about one-half and an inside diameter of about three-eights with a portion 54 of about 19 and a portion 56 of about 6. Coil spring 20 is about 5 long exclusive of top loop 64, and about three-eighths outside diameter. Spring extension 22 is about 7 long measured to the extremity of the end loops. Tube 26 about 12½ long is made of transparent cellulose acetate with an outside diameter of about nineteen thirty-seconds with flange 32 having an outside diameter of about three-fourths. Spacer sleeve 24 is black vinyl about 4½ long with an inside diameter of about twenty-one thirty-seconds and an outside diameter of about twenty-three thirty-seconds. Aperture 28 has a diameter slightly less than twenty-three thirty-seconds, seat 30 about seven thirty-seconds into aperture 28 from the top face of head 14 where the diameter of the aperture abruptly narrows to about five-eighths. Colors 46—50 are blue, green, yellow, orange and red respectively with the vertical dimension of each colored section being about 1 3/16.

Although specific components and portions have been stated in the above description of preferred embodiments of the spring scale of this invention, other suitable materials may be used. In addition many modifications of the structure of the preferred embodiments will occur to those skilled in the art upon a reading of this disclosure including:

a. having other than a circular aperture 28 with a corresponding cross-sectional shape of tube 26 and spacer sleeve 24, for example, square, sector, triangular, rectangular or other polygon cross section or irregular cross section; and b. almost any conventional pan arrangement of the prior art may be subtended from the lower extremity of spring extension 22.

It will be understood that various other changes in the details, materials and arrangements of parts which have been herein described and illustrated in order to explain the nature of the invention, will occur to and may be made by those skilled in the art upon a reading of this disclosure and such changes are intended to be included with the principle and scope of this invention.

We claim:

1. A spring scale comprising:
   a. a support;
   b. a scale head secured to said support;
   c. an open sleeve rigidly attached to said scale head with an elongate dimension substantially parallel to gravitational lines of force having means to indicate the position of a spring within said open sleeve;
   d. an elongate spring within said open sleeve, said spring having a downwardly extending portion for attachment of a spring pan;
   e. means for securing said spring within said open sleeve; and
   f. at least one weighing pan depending from the downwardly extending portion of said spring.

2. A spring scale according to claim 1 wherein said means to indicate is an elongate hollow tube secured in said open sleeve, said spring secured within said tube.

3. A spring scale according to claim 2 wherein said means for securing said spring comprises a spring retainer which is secured to one end of said spring retainer abutting against the uppermost portion of said elongate hollow tube.

4. A spring scale comprising:
   a. a support;
   b. a scale head secured to said support;
   c. an open sleeve in said scale head with an elongate dimension substantially parallel to gravitational lines of force;
   d. an elongate hollow tube secured in said open sleeve;
   e. an elongate spring within said tube, said spring having a downwardly extending portion for attachment to a spring pan;
   f. means for securing said spring within said open tube comprising a spring retainer which is secured to one end at said spring retainer abutting against the uppermost portion of said elongated hollow tube.
   g. a spacer sleeve about an upper portion of said elongate hollow tube, the upper end of said spacer sleeve abutting against an upper portion of said elongate hollow tube, the lower end of said spacer sleeve abutting said scale head; and
   h. at least one weighing pan depending from the downwardly extending portion of said spring.

5. A spring scale according to claim 4 wherein the lower end of said spacer sleeve is seated within said open sleeve.

6. A spring scale according to claim 4 wherein said support comprises an upright tripod stand each leg of the tripod having a substantially vertical elongate portion with a lower shorter portion distending outward.

7. A spring scale according to claim 5 wherein said support comprises an upright tripod stand each leg of the tripod having a substantially vertical elongate portion with a lower shorter portion distending outward.

8. A spring scale according to claim 7 wherein the upper extremity of said elongate portion of each leg is fitted in a snug friction fit in a blind sleeve extending downwardly from the underside of said scale head.

9. A spring scale according to claim 8 wherein said elongate hollow tube is transparent with a vertical scale imprinted thereon.

10. A spring scale according to claim 8 including in combination a vertical color strip scale depending downward from the underside of said head.

11. A spring scale for determining the weight of materials comprising:
    a support
    b. a hollow tube attached to said support having an elongate dimension substantially parallel to gravitational lines of force and a scale of graduations thereon representing a range of weight values;
    c. a spring supported within the said hollow tube having first and second ends, the first end being fixed relative to the tube and the second end extending downwardly within said tube;
    d. a weighing pan adapted to receive the material to be weighed; and
    e. means to attach the second end of the spring to the pan whereby the second end of the spring moves down the tube in response to material being placed in the pan coming to rest adjacent to the scale of graduations on the tube at a position corresponding to the weight of the material in the pan.

12. The spring scale in claim 11 wherein the spring is an elongated spring and said tube is transparent whereby the position of the second end of the spring relative to the scale of graduations on the tube can be seen through the tube.